(12) United States Patent
Shiota et al.

(10) Patent No.: US 10,491,769 B2
(45) Date of Patent: Nov. 26, 2019

(54) IMAGE READING APPARATUS

(71) Applicant: SEIKO EPSON CORPORATION, Tokyo (JP)

(72) Inventors: Takayuki Shiota, Kitakyushu (JP); Masaki Namiki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/015,457

(22) Filed: Jun. 22, 2018

(65) Prior Publication Data
US 2018/0376020 A1 Dec. 27, 2018

(30) Foreign Application Priority Data

Jun. 26, 2017 (JP) ................. 2017-123994

(51) Int. Cl.
H04N 1/00 (2006.01)
G03G 15/00 (2006.01)

(52) U.S. Cl.
CPC ......... *H04N 1/00777* (2013.01); *G03G 15/55* (2013.01); *G03G 15/6511* (2013.01); *G03G 15/70* (2013.01); *H04N 1/00018* (2013.01); *H04N 1/00037* (2013.01); *H04N 1/00588* (2013.01); *H04N 1/00602* (2013.01); *H04N 1/00652* (2013.01); *H04N 1/00702* (2013.01)

(58) Field of Classification Search
CPC .... G03G 15/55; G03G 15/6511; G03G 15/70; H04N 1/00018; H04N 1/00037; H04N 1/00588; H04N 1/00602; H04N 1/00652; H04N 1/00702; H04N 1/00777
USPC .... 271/228, 273, 226, 242, 10.12, 229, 245, 271/246, 265.01, 274, 9.02; 399/395
See application file for complete search history.

(56) References Cited

U.S. PATENT DOCUMENTS

| | | | | |
|---|---|---|---|---|
| 8,851,467 B2* | 10/2014 | Shiota | .................... | B65H 1/266 271/145 |
| 9,022,517 B2* | 5/2015 | Arimori | ................. | B41J 29/393 347/19 |
| 9,119,566 B2* | 9/2015 | Sakai | .................... | A61B 5/6892 |
| 9,283,787 B2* | 3/2016 | Shiota | .................... | B41J 25/001 |

(Continued)

FOREIGN PATENT DOCUMENTS

| | | |
|---|---|---|
| JP | 09-238250 A | 9/1997 |
| JP | 2004-182419 A | 7/2004 |

(Continued)

OTHER PUBLICATIONS

European Search Report issued in Application No. 18179710 dated Oct. 5, 2018.

*Primary Examiner* — Negussie Worku
(74) *Attorney, Agent, or Firm* — Workman Nydegger

(57) ABSTRACT

An image reading apparatus includes feeding rollers configured to come into contact with the lowermost medium of media mounted on a medium mounting section and transport the medium toward a downstream side, separation rollers configured to nip and separate the medium with the feeding rollers therebetween, and a medium detection section configured to detect the medium at a detection position closer to an edge side of the medium than the nip positions of the feeding rollers and the separation rollers in the medium width direction and the detection position overlapping one of the feeding rollers and the separation rollers in a side view of the medium transport path.

7 Claims, 16 Drawing Sheets

(56) References Cited

U.S. PATENT DOCUMENTS

| | | | |
|---|---|---|---|
| 9,321,272 B2* | 4/2016 | Mizutani | B41J 2/1752 |
| 9,987,846 B2* | 6/2018 | Shiota | B41J 2/16508 |
| 10,091,372 B2* | 10/2018 | Shiota | B65H 3/06 |
| 2005/0286916 A1* | 12/2005 | Nakazato | G03G 15/6573 |
| | | | 399/16 |
| 2007/0114716 A1 | 5/2007 | Morikawa et al. | |
| 2009/0295075 A1* | 12/2009 | Inoue | B65H 9/006 |
| | | | 271/226 |
| 2012/0321365 A1* | 12/2012 | Sendo | G03G 15/6508 |
| | | | 399/410 |
| 2014/0054845 A1 | 2/2014 | Morikawa et al. | |
| 2014/0077446 A1 | 3/2014 | Hongo et al. | |
| 2017/0066262 A1 | 3/2017 | Kimura | |
| 2017/0225494 A1* | 8/2017 | Tokunaga | B41J 13/0009 |
| 2018/0041651 A1* | 2/2018 | Nakamura | H04N 1/00588 |
| 2018/0220022 A1* | 8/2018 | Yoshikaie | B65H 7/02 |
| 2018/0376020 A1* | 12/2018 | Shiota | H04N 1/00018 |
| 2019/0037092 A1* | 1/2019 | Shiota | H04N 1/00734 |

FOREIGN PATENT DOCUMENTS

| | | |
|---|---|---|
| JP | 2008-137734 A | 6/2008 |
| JP | 2008169026 A | 7/2008 |
| JP | 2008-230759 A | 10/2008 |
| JP | 2013-184818 A | 9/2013 |
| JP | 2014-058360 A | 4/2014 |
| JP | 2017-047631 A | 3/2017 |
| JP | 2018-125638 | 8/2018 |

* cited by examiner

IMAGE READING APPARATUS

BACKGROUND

1. Technical Field

The present invention relates to an image reading apparatus for reading a surface of a medium.

2. Related Art

Some image reading apparatuses such as scanners include an auto document feeder (ADF) for automatically feeding documents, which are example media. Such image reading apparatuses can automatically feed and read a plurality of sheets of documents. For example, JP-A-2013-184818 and JP-A-2014-058360 disclose such image reading apparatuses.

The image reading apparatuses also include a sensor for detecting the passage of a leading edge of a medium. The image reading apparatus described in JP-A-2013-184818 includes a transport roller 4, which is disposed on the upstream side of an image reading unit 5 for performing reading, and a medium sensor 13, which is provided between the image reading unit 5 and the transport roller 4, for detecting the passage of a medium. When the medium sensor 13 detects the passage of a leading edge of a medium, the medium sensor 13 determines that the medium has reached the transport roller 4 and stops the rotation of a feeding roller 2.

In some cases, a user may erroneously set a batch of documents that are stapled together to an image reading apparatus and its feeding job may be started. In such a case, only the document being in contact with the feeding roller will be fed but the fed document will be deformed due to the stapled portion and may cause a paper jam.

To detect the occurrence of a jam, several techniques have been proposed for known image reading apparatuses. For example, JP-A-2014-058360 discloses a technique for determining whether a jam has occurred in accordance with a sound generated in a document transport path. However, as described above, when a feeding job is executed for a batch of stapled documents and the documents cause a jam, the documents may be irreversibly damaged, for example, tears may be produced. Consequently, the above-mentioned technical problem is not satisfactorily solved only by the known jam determination techniques, and more effective jam determination techniques are required.

SUMMARY

An advantage of some aspects of the invention is that there is provided an image reading apparatus capable of detecting deformation of a medium to prevent the medium from being damaged before the medium cause a jam.

An image reading apparatus according to an aspect of the invention includes a medium mounting section on which media are to be mounted, feeding rollers configured to come into contact with the lowermost medium of media mounted on the medium mounting section and transport the medium toward a downstream side, the feeding rollers being provided in a central region in a medium width direction that intersects a medium transport direction, separation rollers configured to nip and separate the medium with the feeding rollers therebetween, a reading section provided on the downstream side of the feeding rollers, the reading section being configured to read the medium, and a medium detection section configured to detect the medium at a detection position closer to an edge side of the medium than the nip positions of the feeding rollers and the separation rollers in the medium width direction and the detection position overlapping one of the feeding rollers and the separation rollers in a side view of the medium transport path.

According to this aspect, an image reading apparatus includes a medium detection section configured to detect the medium at a detection position closer to an edge side of the medium than the nip positions of the feeding rollers and the separation rollers in the medium width direction and the detection position overlapping one of the feeding rollers and the separation rollers in a side view of the medium transport path. Consequently, a medium that has entered the detection position due to a deformation can be detected, that is, by detecting a deformation in a medium before the medium causes a jam, damages to the medium can be reduced or prevented.

It is preferable that the detection positions be provided at a position overlapping the separation roller in the side view of the medium transport path and a position overlapping the feeding roller in the side view of the medium transport path.

In this case, the detection positions are provided at a position overlapping the separation roller in the side view of the medium transport path and a position overlapping the feeding roller in the side view of the medium transport path. Consequently, if the medium is deformed to either the separation roller side or the feeding roller side, the deformation can be detected.

It is preferable that the detection position be provided at a position overlapping the separation roller in the side view of the medium transport path. In this structure in which the lowermost medium of the media mounted on the medium mounting section is fed, particularly, when a feed job is performed on media that are stapled on the upstream side, the medium (the lowermost medium) being fed tends to be deformed to the separation roller side. To solve the problem, in this structure, the detection position is provided to the position overlapping the separation roller in the side view of the medium transport path. Consequently, a deformation in the medium can be detected more efficiently before the medium causes a jam.

It is preferable that the detection position be on the downstream side of the nip positions of the feeding rollers and the separation rollers in the medium transport direction and on a side closer to the feeding roller side than a rotation central position of the separation roller in a direction intersecting a surface of the medium.

With this structure, the detection section is provided in the region where a deformed medium tends to enter more easily, that is, at the position on the downstream side of the nip positions of the feeding rollers and the separation rollers in the medium transport direction, and on the side closer to the feeding roller side than the rotation central position of the separation roller in the direction that intersects the surface of the medium. Accordingly, a deformation in the medium can be detected more efficiently before the medium causes a jam.

It is preferable that the image reading apparatus further include a regulation section configured to regulate an entry of the medium into a region on the separation roller side in the side view of the medium transport path at a position closer to the edge of the medium than the detection position in the medium width direction.

For example, a medium that is warped to some extent at its edges can enter the detection position although the deformations are not so serious to cause a jam and in such a case, the image reading apparatus may erroneously determine to stop the feeding. To solve the problem, this structure includes the regulation section that regulates an entry of the medium into a region on the separation roller side in the side view of the medium transport path at a position closer to the edge of the medium than the detection position in the medium width direction. Consequently, entering of a medium, which can be continued to be fed properly without problems, into the detection position can be prevented and thereby the above-described erroneous determination can be reduced or prevented.

It is preferable that the image reading apparatus include a controller configured to control the feeding rollers. If the medium detection section detects the medium at the detection position, the controller stops the feeding rollers.

In this case, if the medium detection section detects the medium at the detection position, the controller stops the feeding rollers. Accordingly, the feeding operation is stopped before the medium causes a jam, and thereby damages to the medium can be prevented or damages to the medium can be reduced.

It is preferable that the image reading apparatus include transport rollers provided on an upstream side of the reading section, the transport rollers being configured to transport the medium toward the reading section side, a passage detection section provided between the transport rollers and the feeding rollers, the passage detection section being configured to detect a passage of the medium, and a controller configured to control the feeding rollers. If the medium detection section detects the medium at the detection position, the controller drives the feeding rollers by an amount corresponding to a distance from the detection position to the passage detection section, if the passage detection section has detected a passage of a leading edge of the medium as a result of the drive of the feeding rollers, the controller continues to feed the medium by the feeding rollers, and if the passage detection section has not detected a passage of a leading edge of the medium as a result of the drive of the feeding rollers, the controller stops the feeding rollers.

In this case, when the medium detection section detects the medium at the detection position, the controller drives the feeding rollers by an amount corresponding to the distance from the detection position to the passage detection section and if the passage detection section has detected a passage of a leading edge of the medium as a result of the drive of the feeding rollers, the controller continues to feed the medium by the feeding rollers. In other words, if the passage detection section detects a passage of the leading edge of the medium that has been detected by the medium detection section, the medium can be properly fed, and in such a case, the feeding can be continued. With this operation, the image reading apparatus can be prevented from unnecessarily stopping the feeding.

As a result of the drive of the feeding rollers, if the passage detection section has not detected a passage of the leading edge of the medium, the controller determines that a jam has occurred and stops the feeding rollers. Consequently, damages to the medium can be prevented or damages to the medium can be reduced. It should be noted that the expression "drive the feeding rollers by an amount corresponding to a distance from the detection position to the passage detection section" does not mean to drive the feeding rollers to transport the medium exactly from the detection position to the passage detection section, and allows some margins for some cases including the case "drive the feeding rollers from the detection position to the passage detection section".

It is preferable that the detection position be provided at a position overlapping the feeding roller in the side view of the medium transport path. In this case, the detection position is provided at a position overlapping the feeding roller in the side view of the medium transport path. With this structure, the medium that has been deformed to the feeding roller side can be detected, and consequently, the deformed medium can be detected before it causes a jam and damages to the medium can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
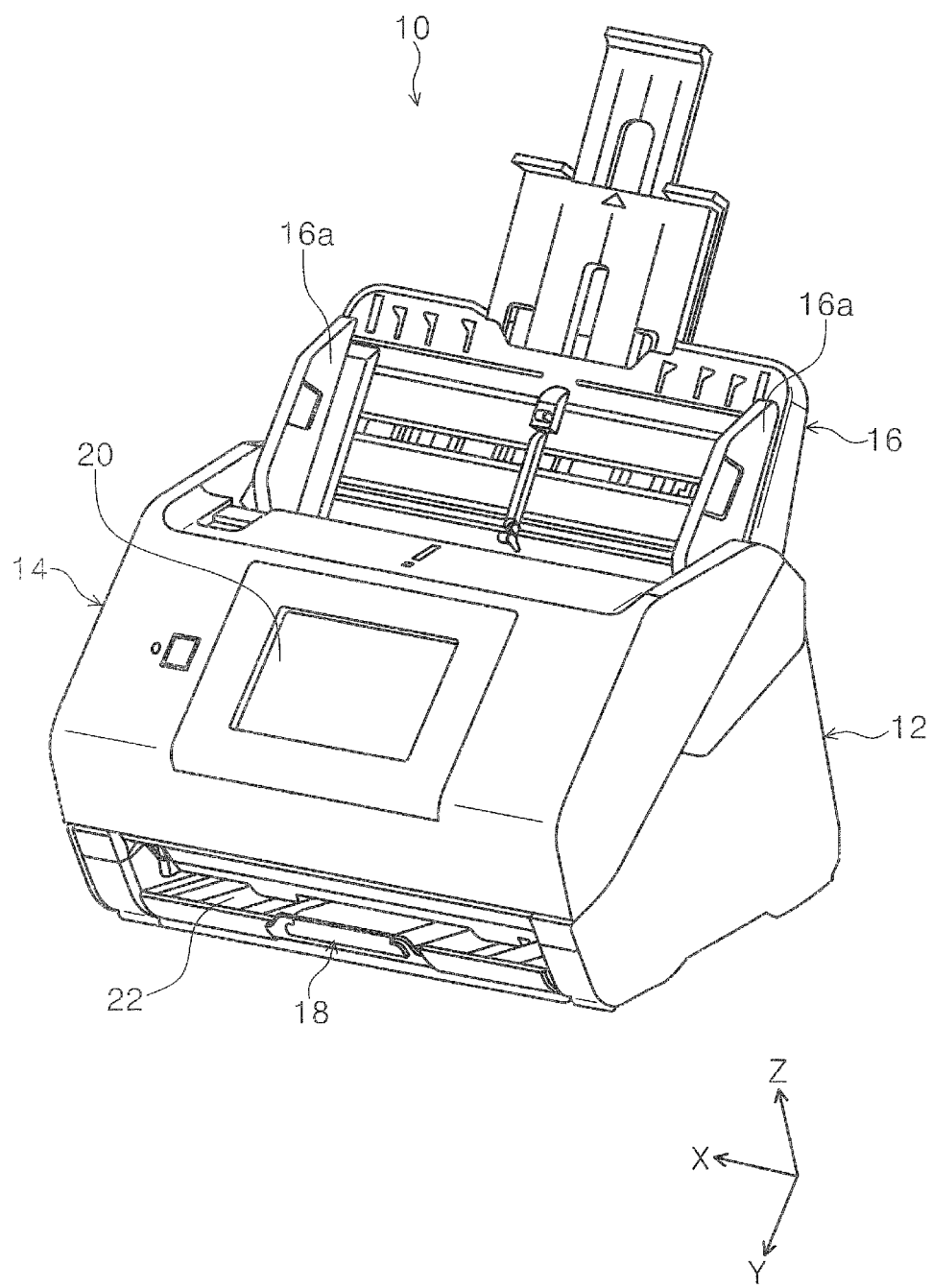
FIG. 1 is an external perspective view of a scanner according to an embodiment of the invention.

Hereinafter, embodiments of the invention will be described with reference to the attached drawings. In the embodiments described below, to the same components, the same reference numerals are given, and their descriptions will be made only in respective first embodiments and will be omitted in the subsequent embodiments.

Figure 2:
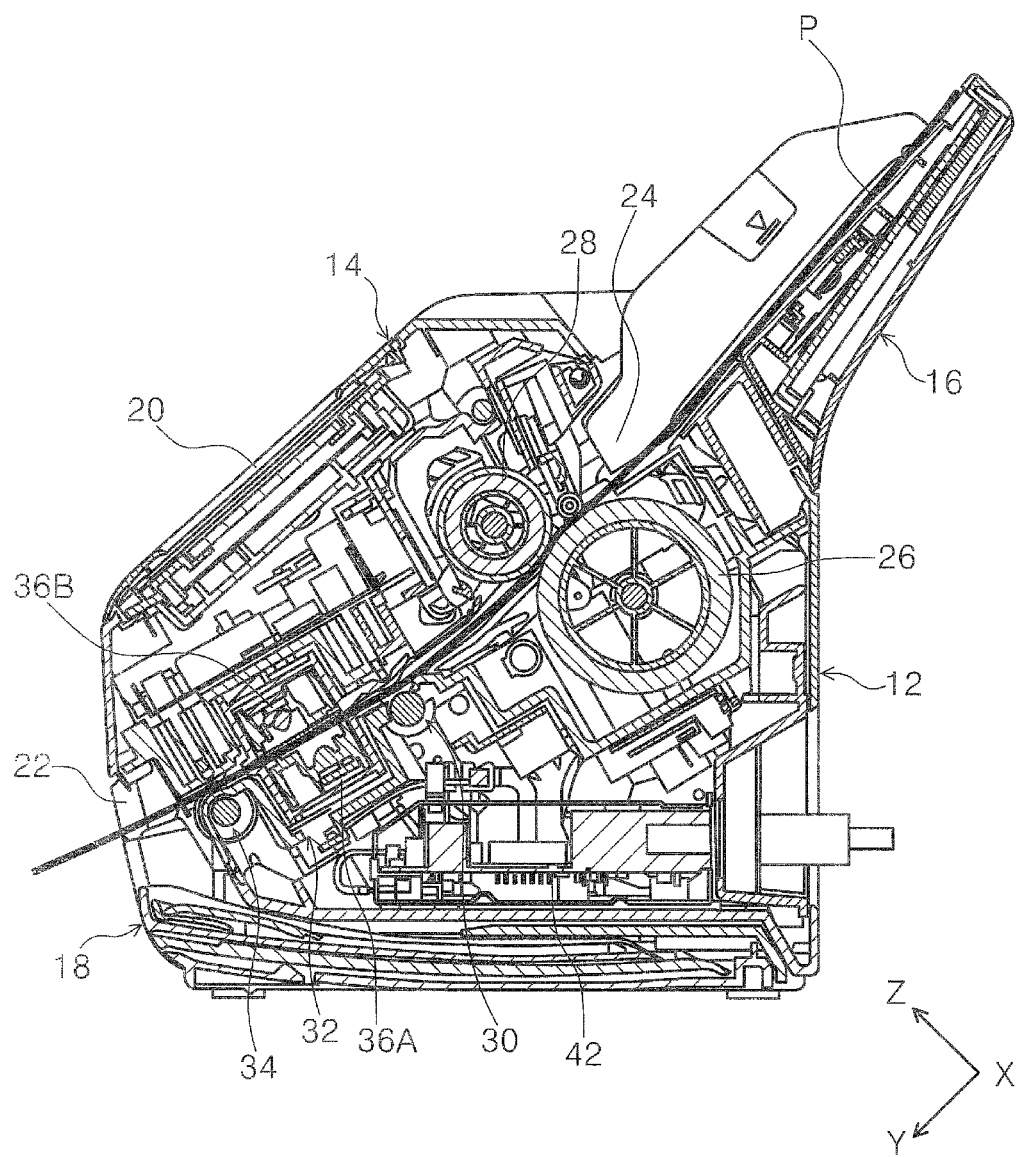
FIG. 2 is a side view of a medium transport path in the scanner according to the embodiment of the invention.
Figure 3:
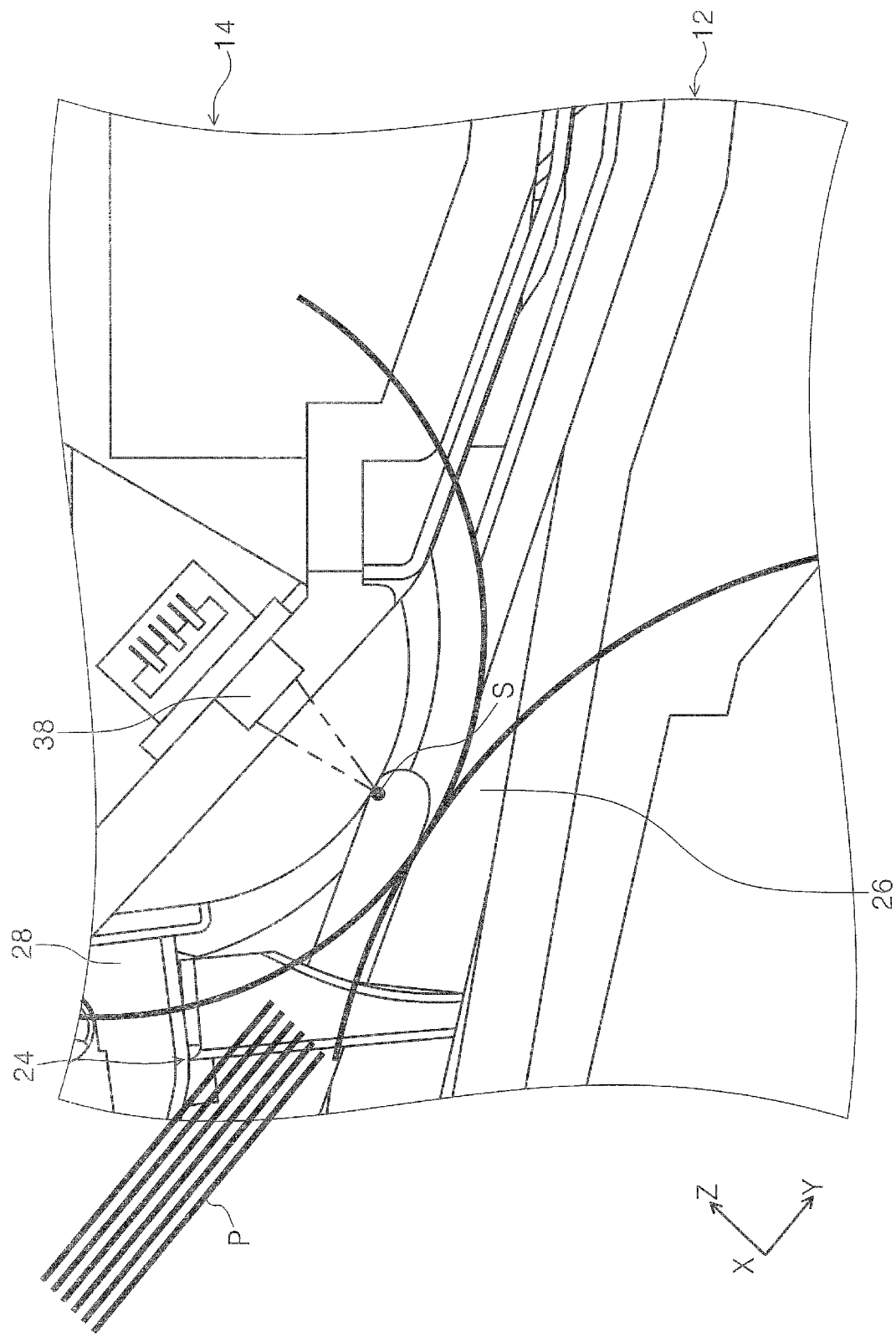
FIG. 3 is a side view illustrating a positional relationship between a detection position of a medium detection sensor and a separation roller.

FIG. 1 is an external perspective view of a scanner according to an embodiment of the invention. FIG. 2 is a side view of a medium transport path in the scanner according to the embodiment of the invention. FIG. 3 is a side view illustrating a positional relationship between a detection position of a medium detection sensor and a separation roller.

Figure 4:
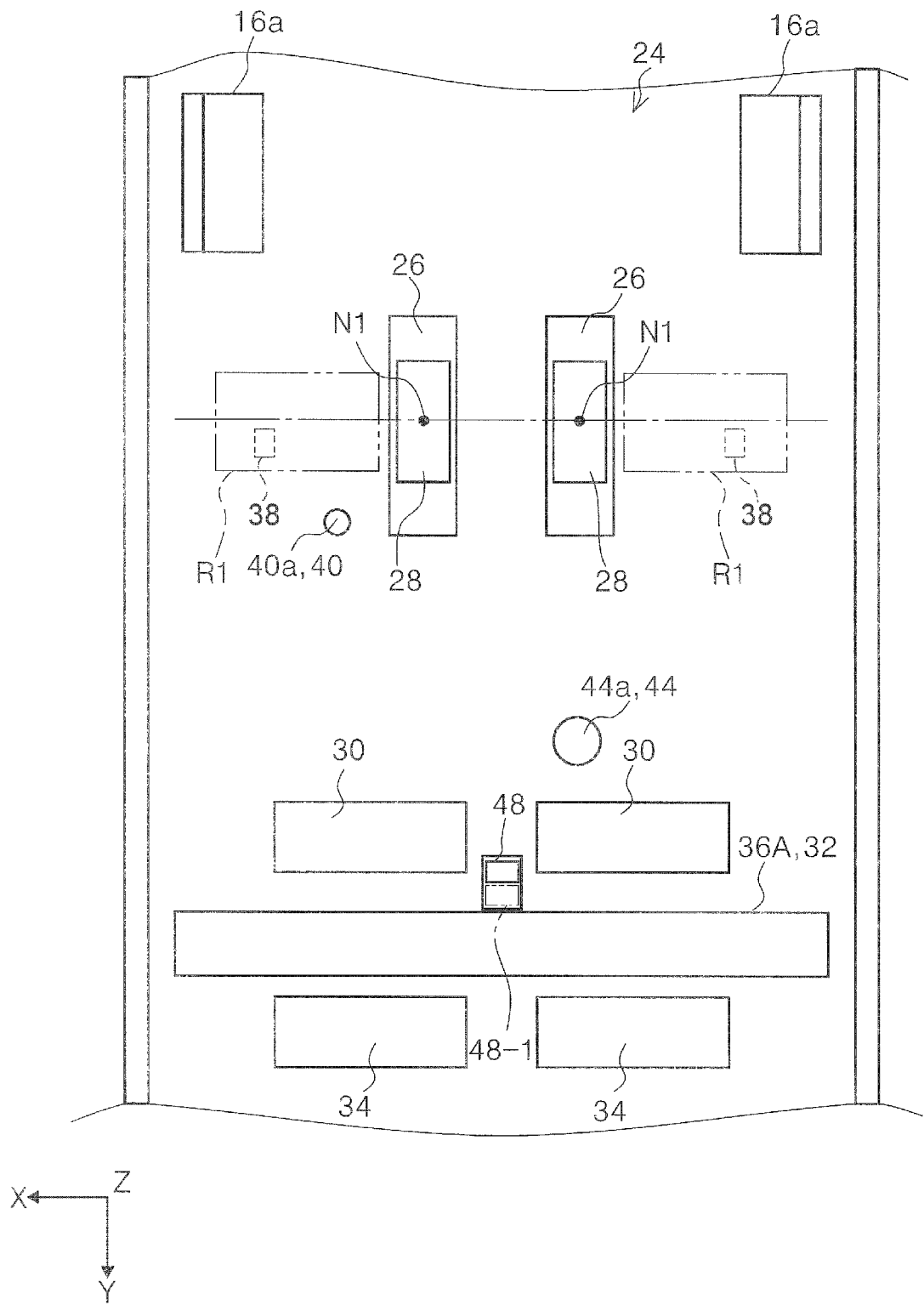
FIG. 4 is a schematic view of the medium transport path in the scanner, the view illustrating a relationship between the detection positions of the medium detection sensors and the separation rollers.
Figure 5:
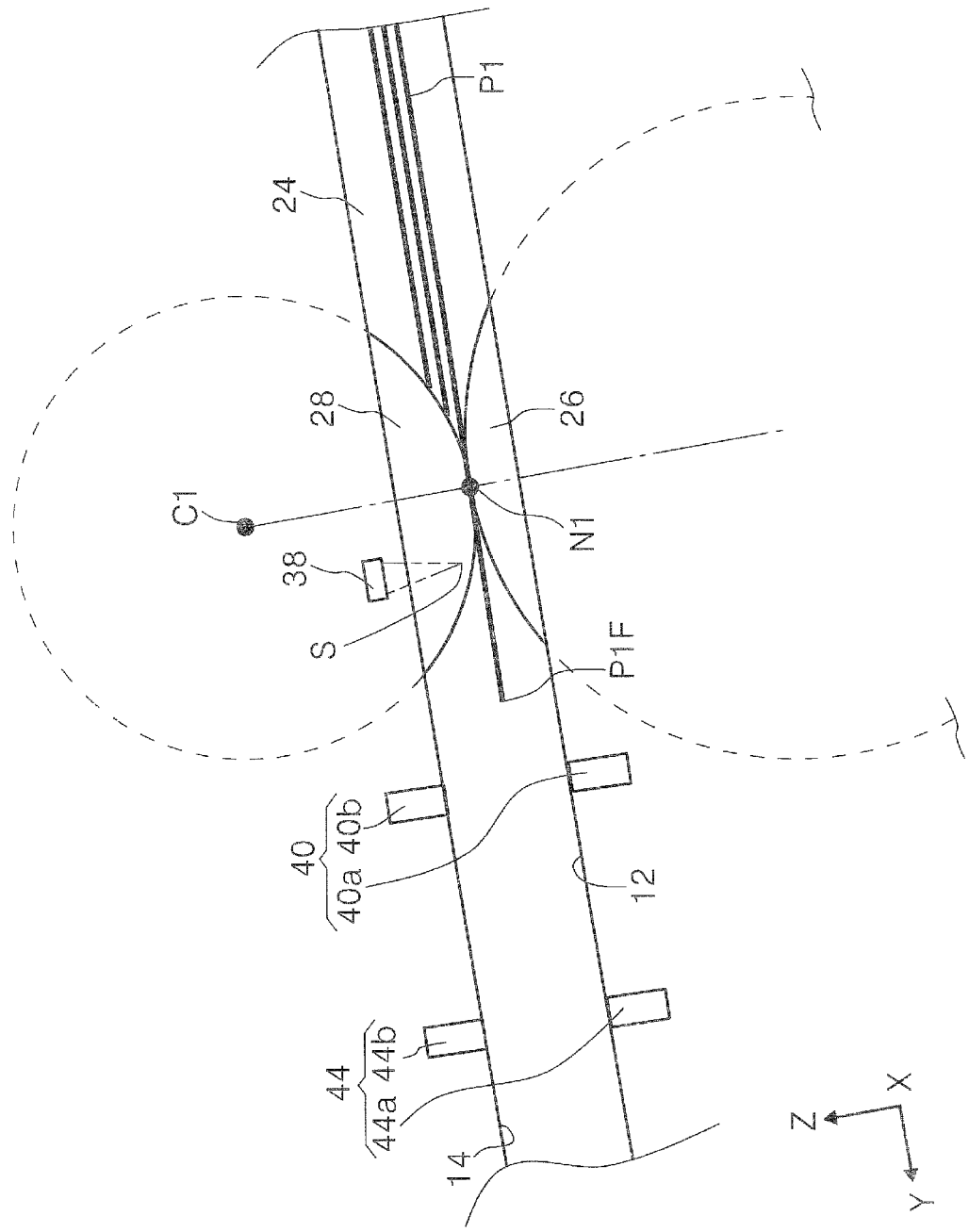
FIG. 5 is a schematic side view of the medium transport path, the view illustrating a medium that is being normally transported.

FIG. 4 is a schematic view of a medium transport path in the scanner, the view illustrating a relationship between the detection positions of the medium detection sensors and the separation rollers. FIG. 5 is a schematic side view of the medium transport path, the view illustrating a medium that is being normally transported.

Figure 6:
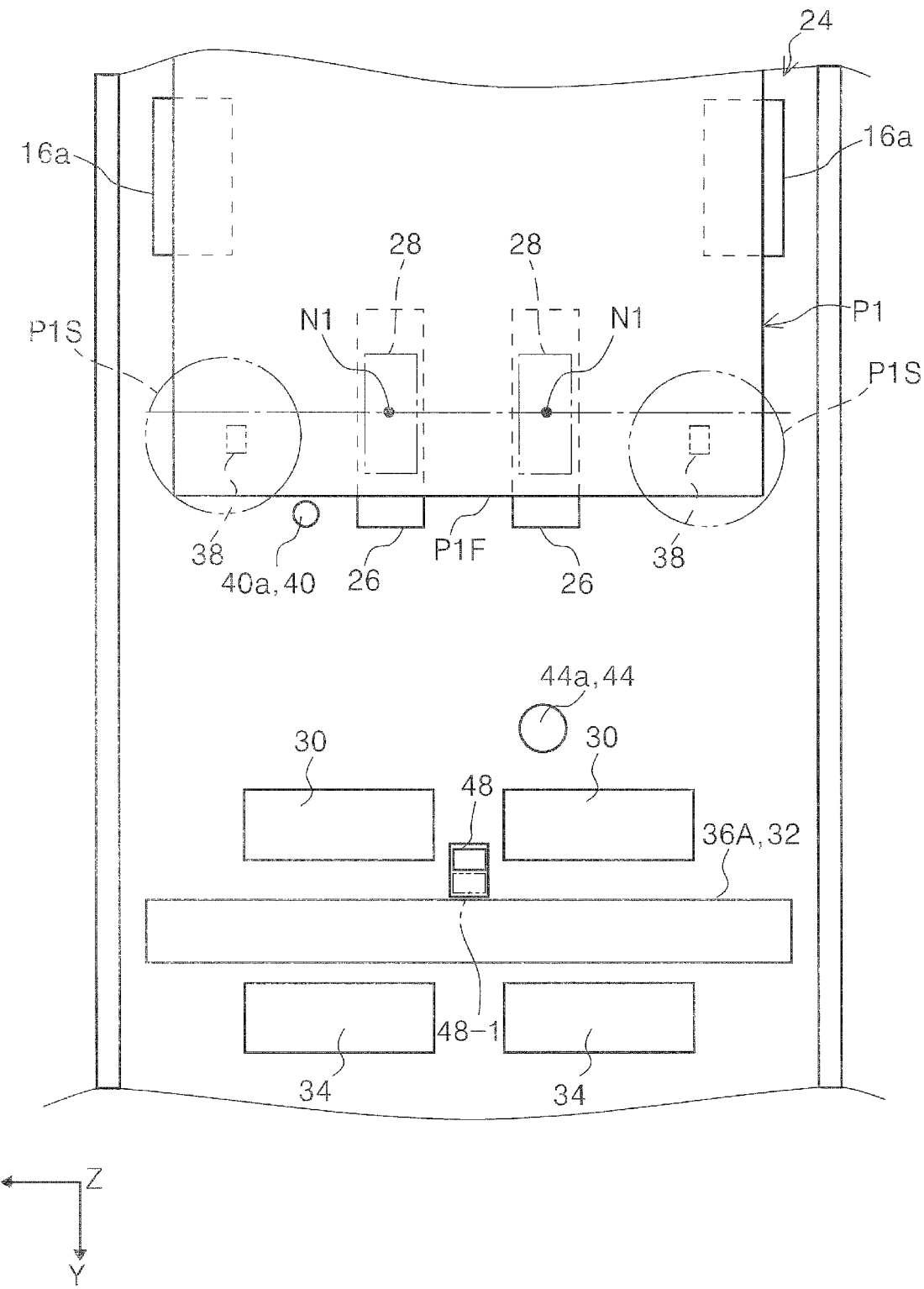
FIG. 6 is a schematic view of the medium transport path in the scanner, the view illustrating a medium that is being normally transported.
Figure 7:
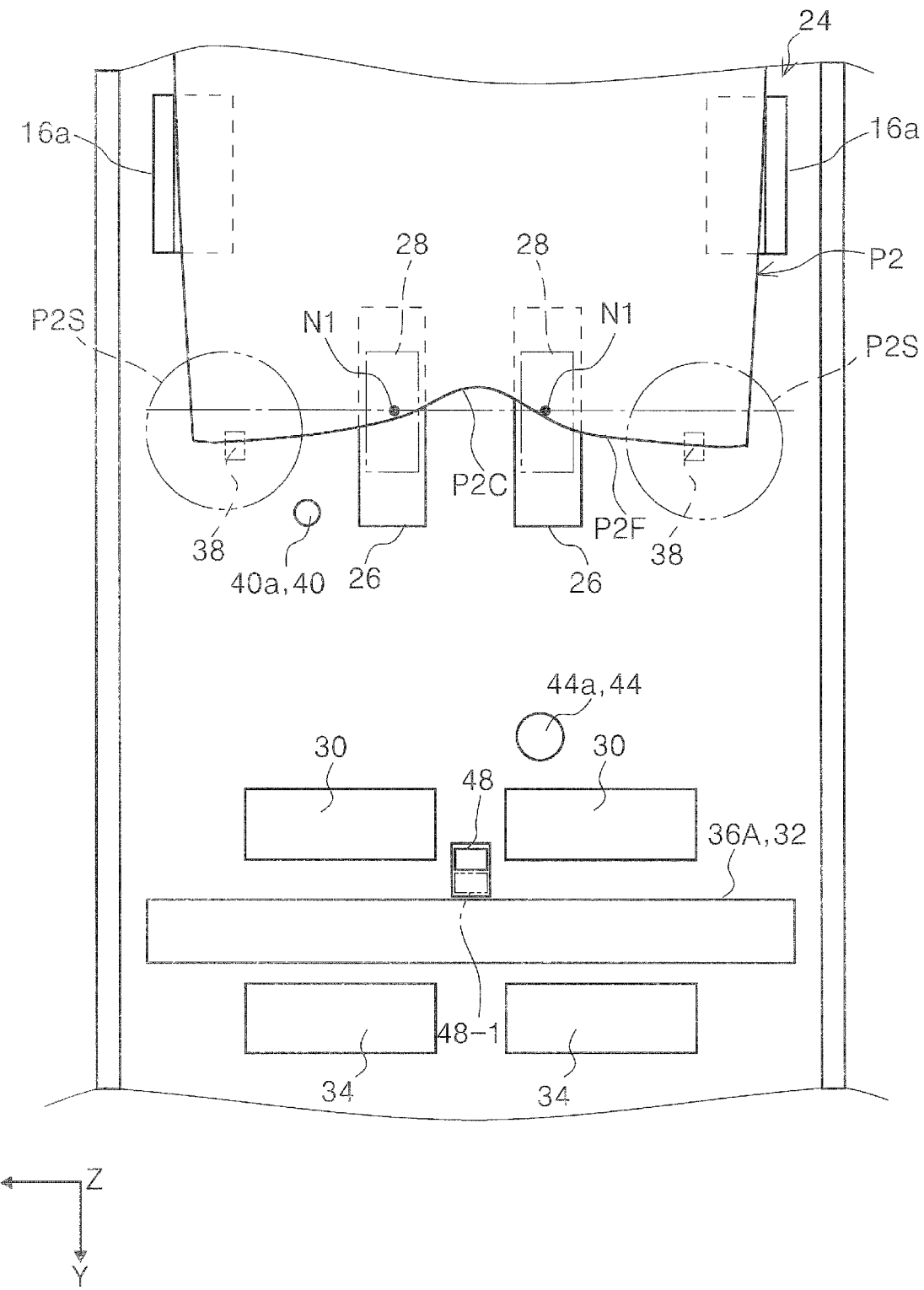
FIG. 7 is a schematic view of the medium transport path in the scanner, the view illustrating a relationship between a medium and the medium detection sensors when a jam has occurred in a central section in a medium width direction.
Figure 8:
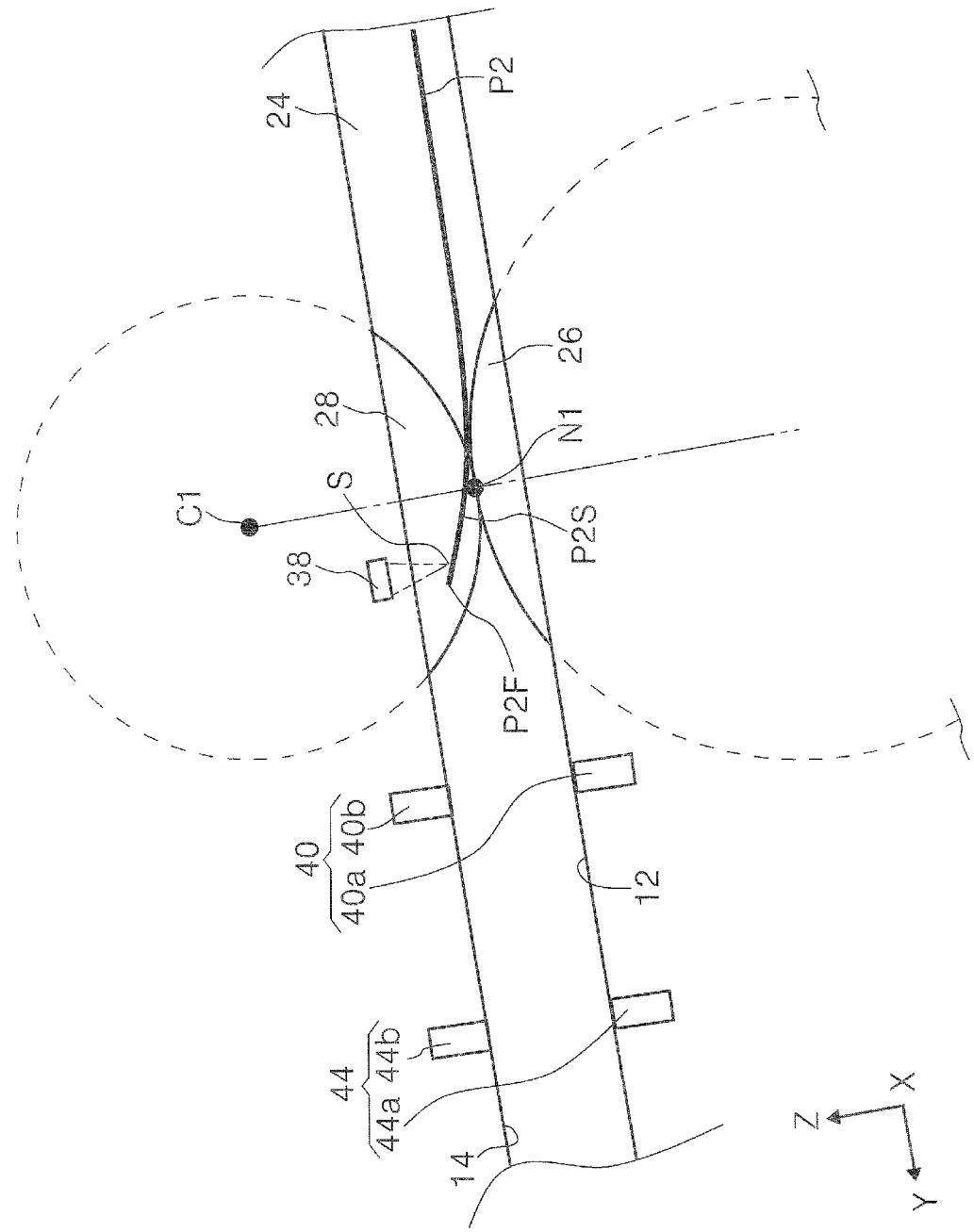
FIG. 8 is a schematic side view of the medium transport path, the view illustrating a relationship between the medium and the medium detection sensor in FIG. 7.

FIG. 6 is a schematic view of the medium transport path in the scanner, the view illustrating a medium that is being normally transported. FIG. 7 is a schematic view of the medium transport path in the scanner, the view illustrating a relationship between a medium and the medium detection sensors when a jam has occurred in a central section in a medium width direction. FIG. 8 is a schematic side view of the medium transport path, the view illustrating a relationship between the medium and the medium detection sensor in FIG. 7.

Figure 9:
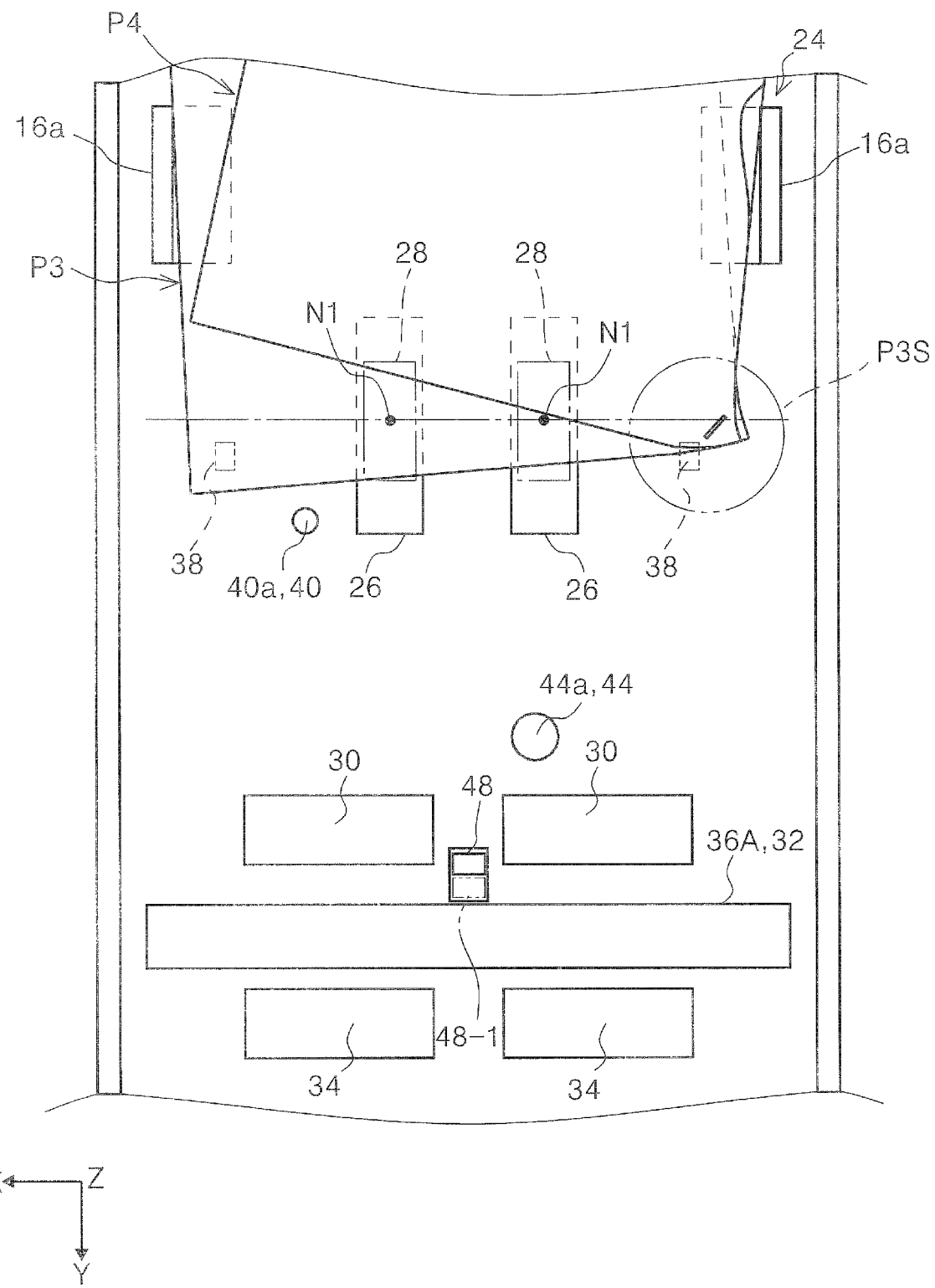
FIG. 9 is a schematic view of the medium transport path in the scanner, the view illustrating a relationship between stapled media and the medium detection sensors when the media are being transported.
Figure 10:
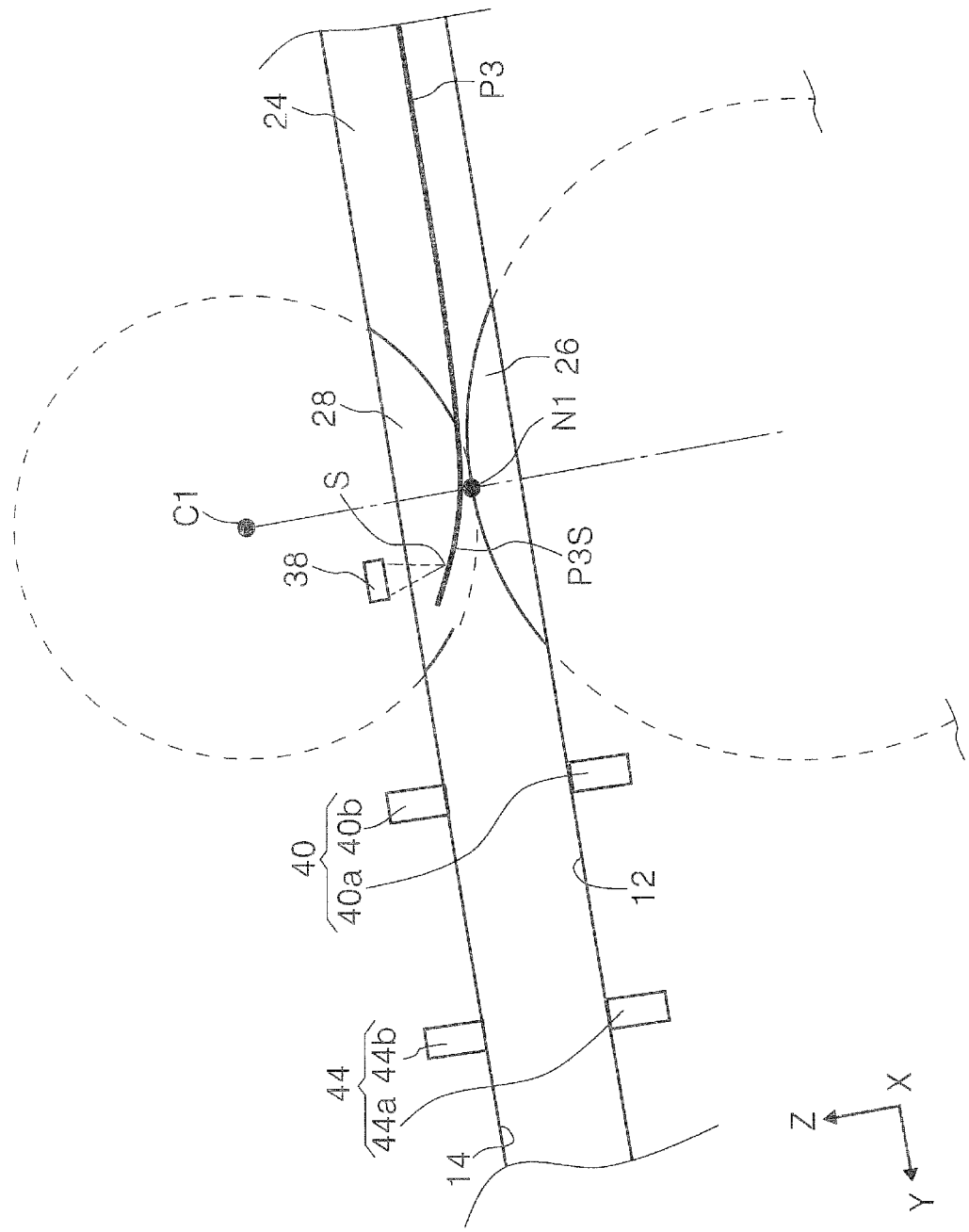
FIG. 10 is a schematic side view of the medium transport path, the view illustrating a relationship between the medium and the medium detection sensor in FIG. 8.
Figure 11:
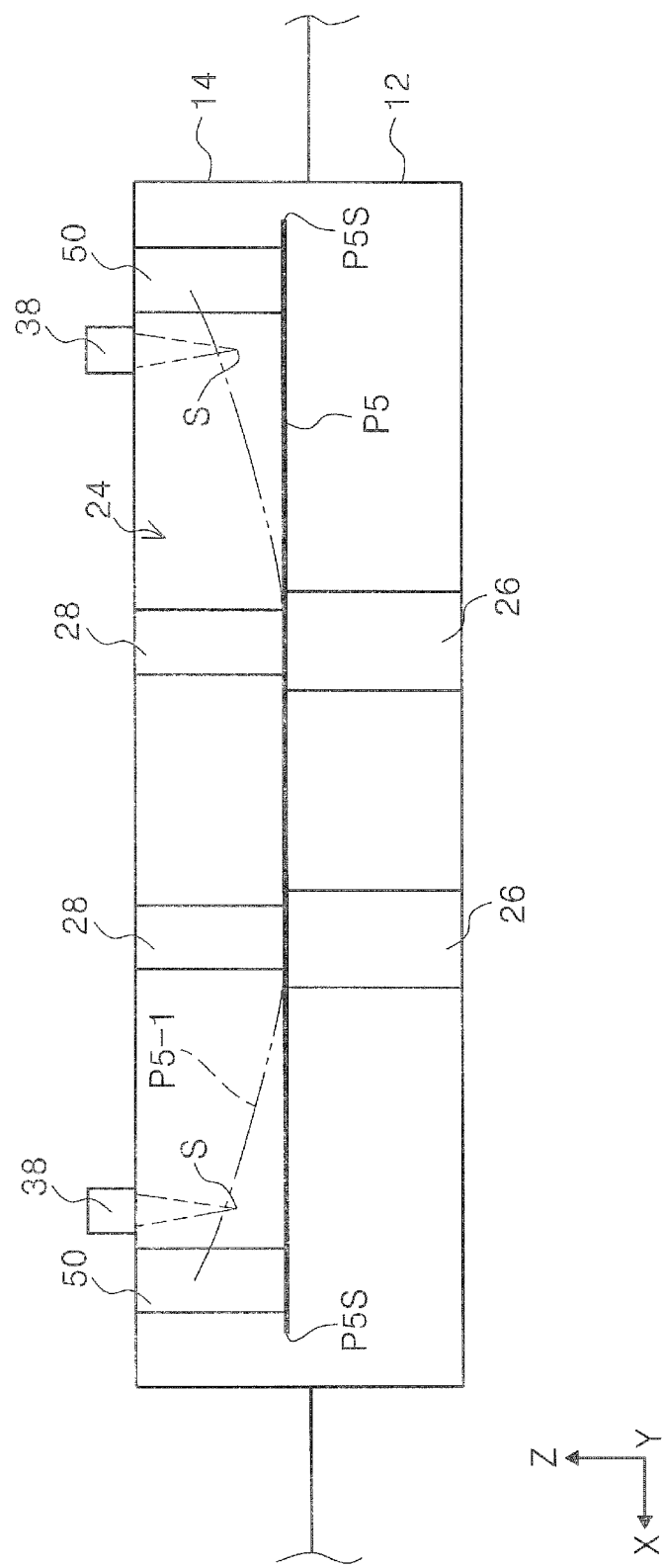
FIG. 11 is a perspective view illustrating regulation sections that are disposed on an upper unit side and protrude toward the medium transport path.
Figure 12:
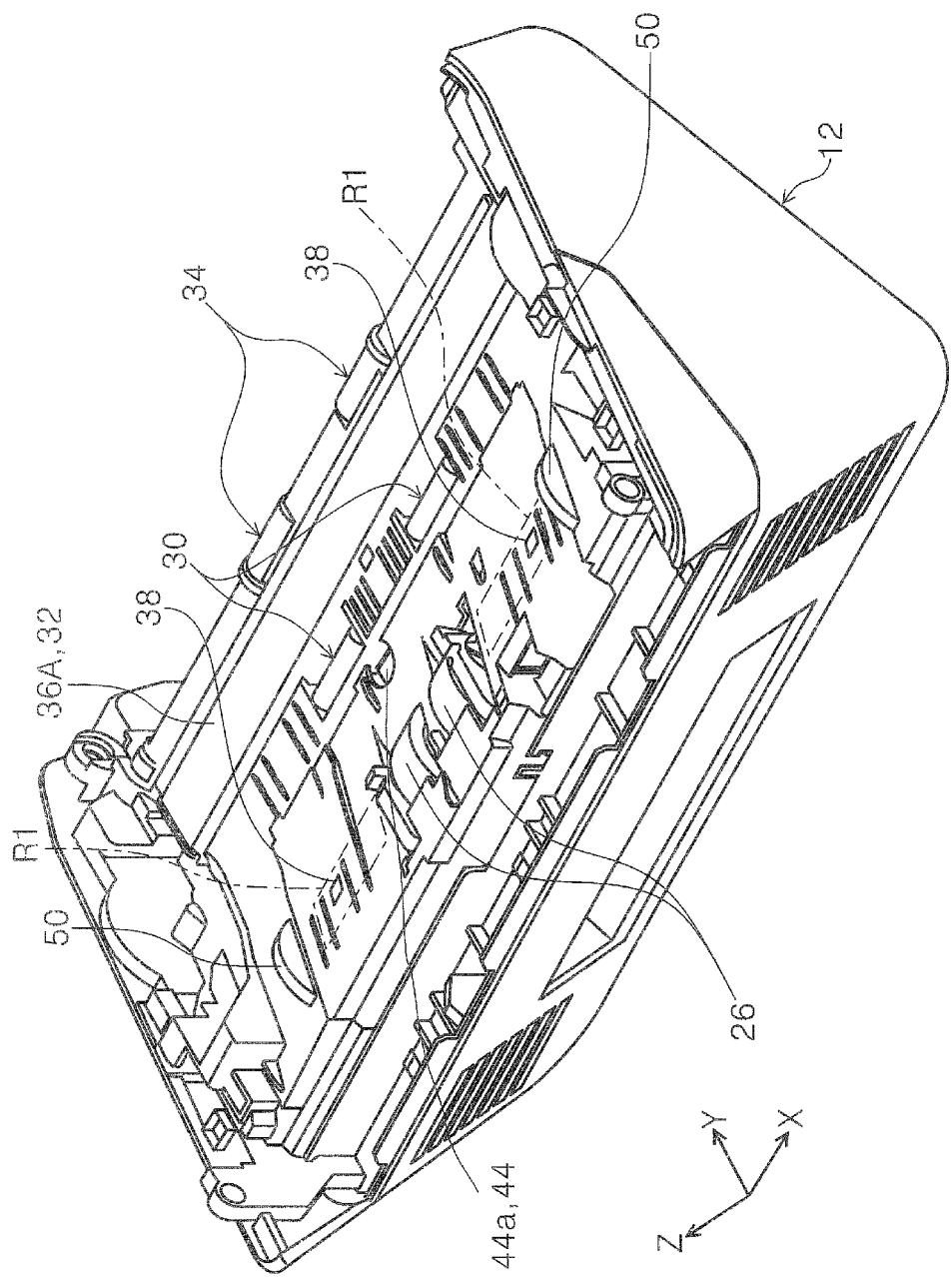
FIG. 12 is a perspective view illustrating regulation sections that are disposed on a lower unit side and protrude toward the medium transport path.

FIG. 9 is a schematic view of the medium transport path in the scanner, the view illustrating a relationship between stapled media and the medium detection sensors when the media are being transported. FIG. 10 is a schematic side view of the medium transport path, the view illustrating a relationship between the medium and the medium detection sensor in FIG. 8. FIG. 11 is a perspective view illustrating regulation sections that are disposed on an upper unit side and protrude toward the medium transport path. FIG. 12 is a perspective view illustrating regulation sections that are disposed on a lower unit side and protrude toward the medium transport path.

Figure 13:
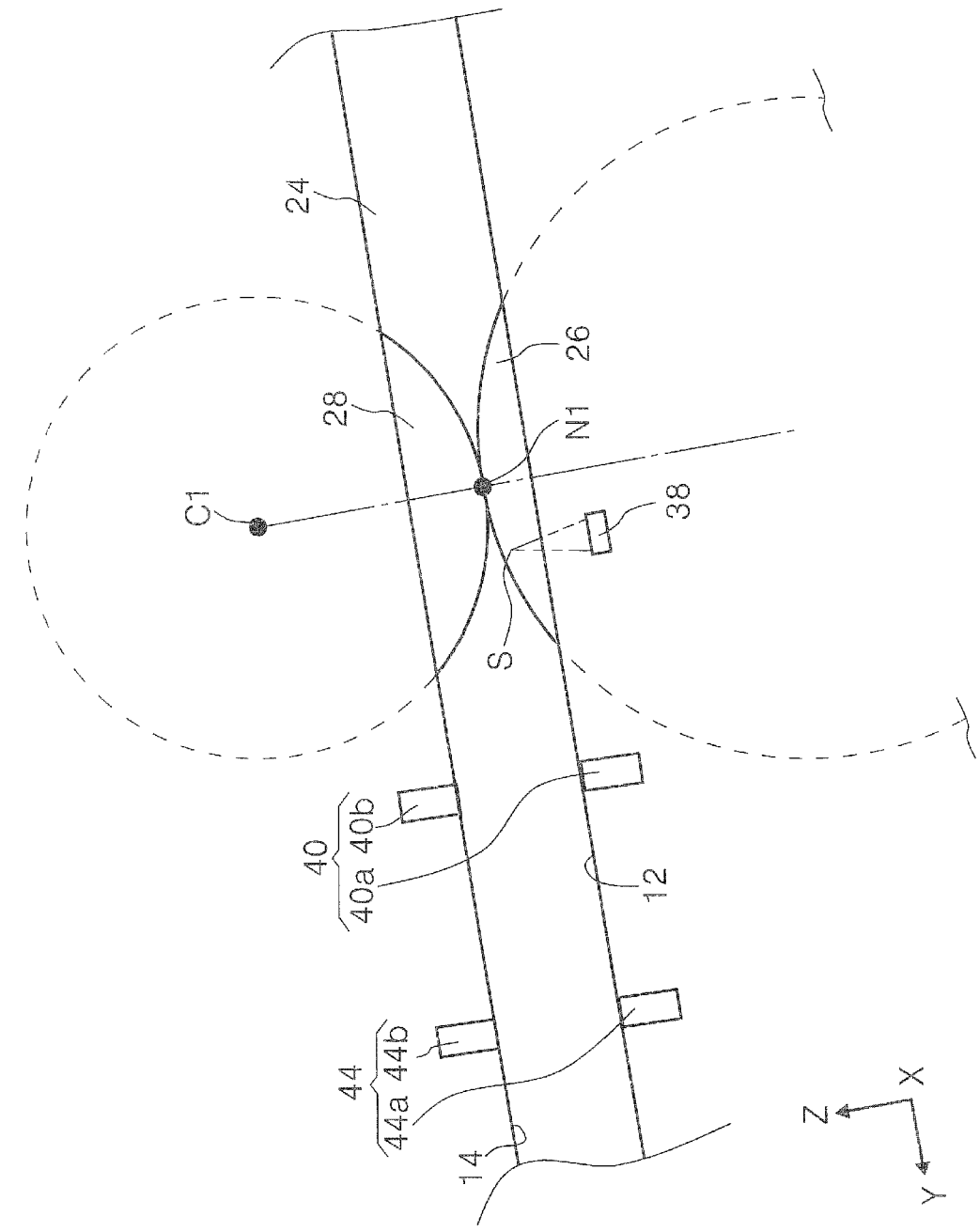
FIG. 13 illustrates a modification of the arrangement of the medium detection sensor.
Figure 14:
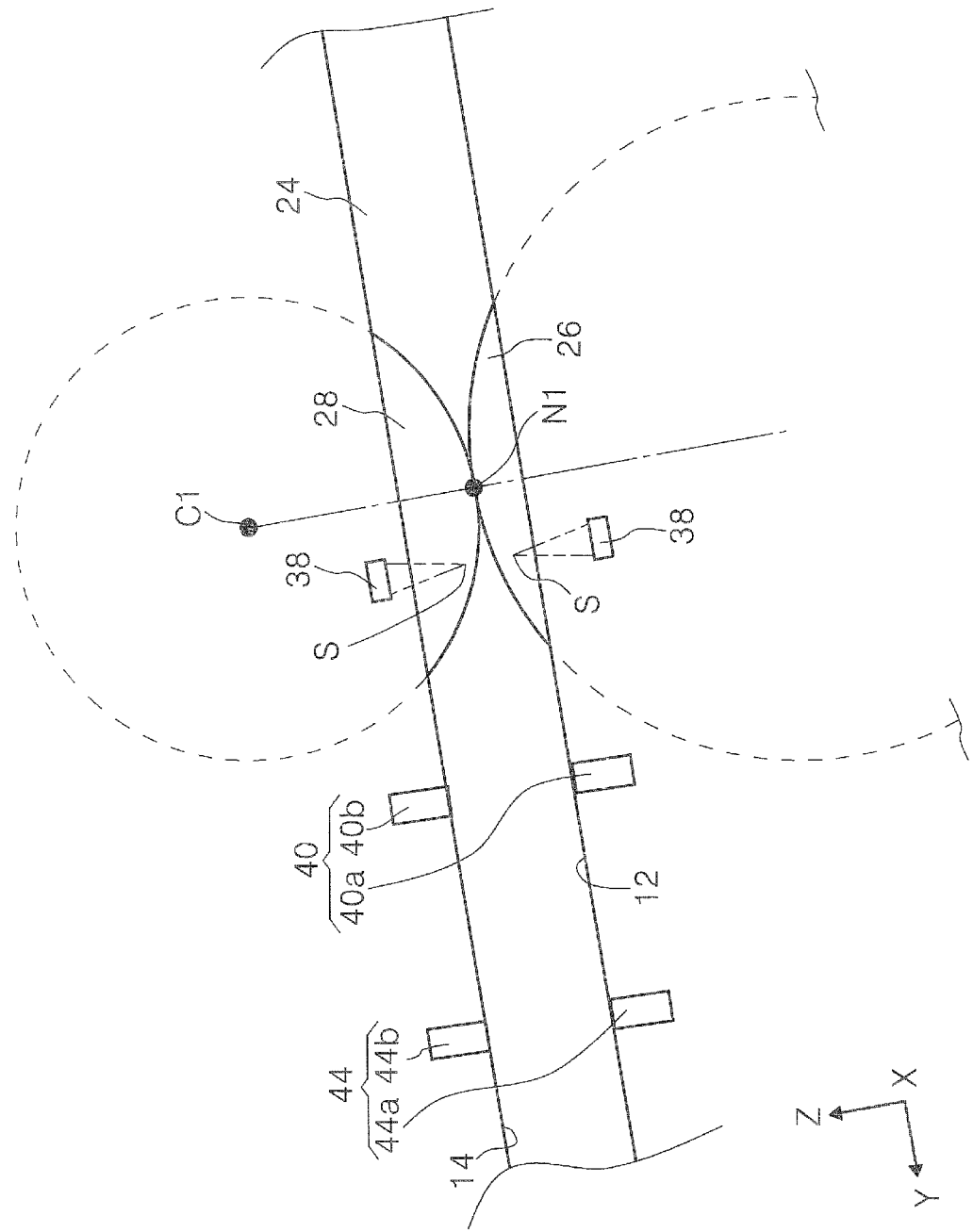
FIG. 14 illustrates a modification of the arrangement of the medium detection sensors.
Figure 15:
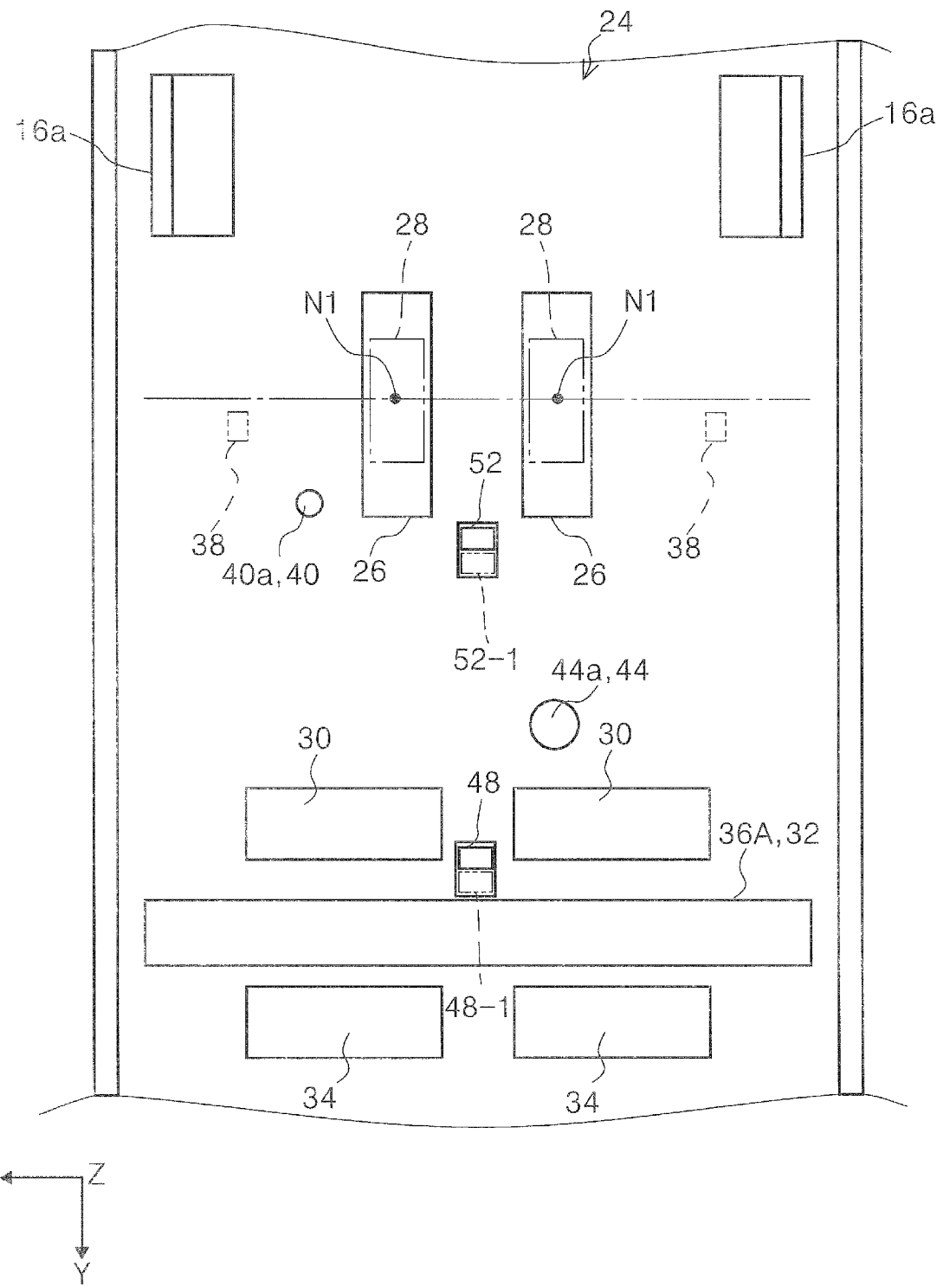
FIG. 15 schematically illustrates a medium transport path of a scanner according to a second embodiment.
Figure 16:
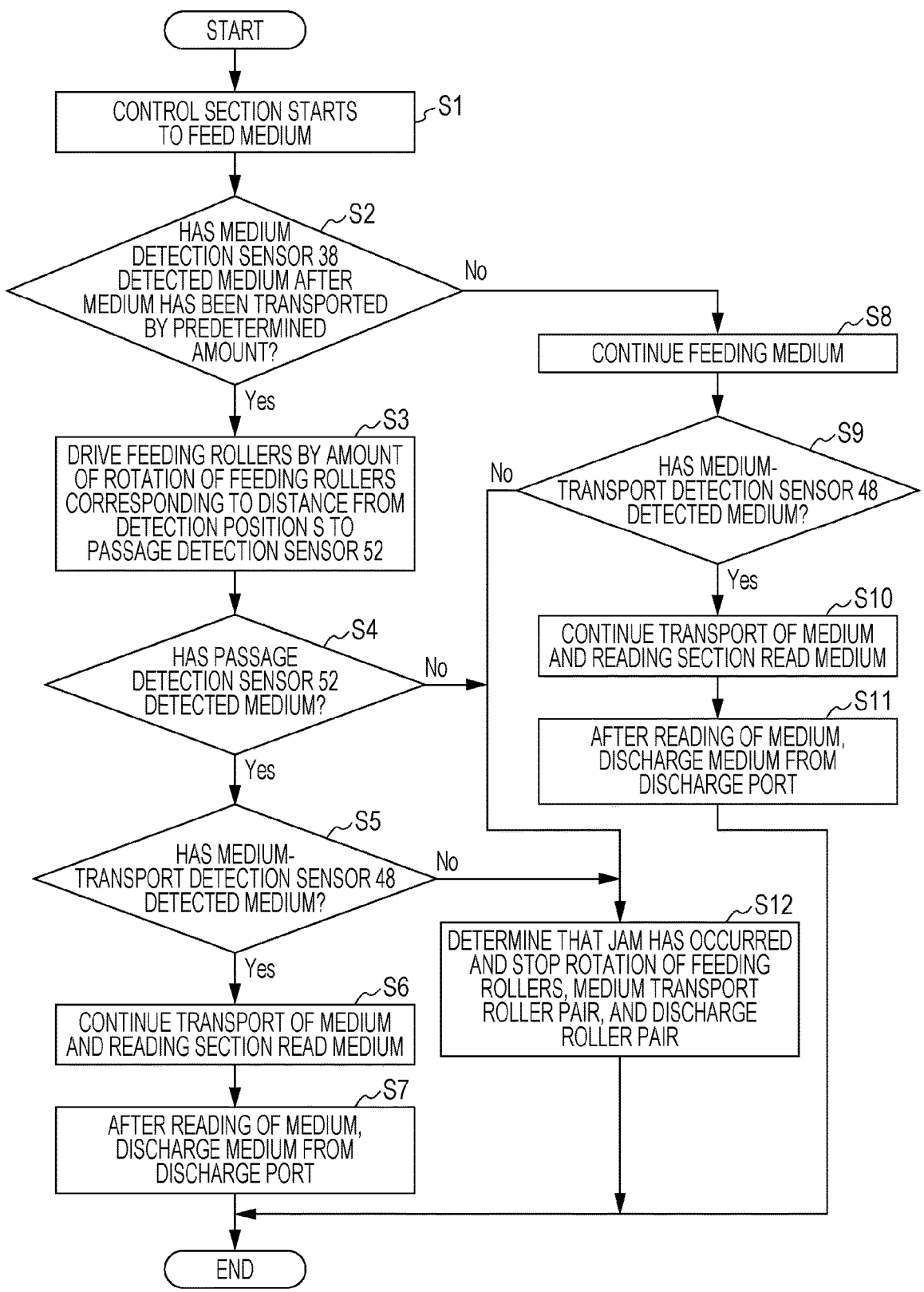
FIG. 16 is a flowchart of feeding operations according to the second embodiment.

FIG. 13 illustrates a modification of the arrangement of the medium detection sensor. FIG. 14 illustrates a modification of the arrangement of the medium detection sensors. FIG. 15 schematically illustrates a medium transport path of a scanner according to a second embodiment. FIG. 16 is a flowchart of feeding operations according to the second embodiment.

In an X-Y-Z coordinate system in each drawing, an X direction denotes an apparatus width direction and also denotes a medium width direction, a Y direction denotes a medium transport direction in the image reading apparatus, and a Z direction is orthogonal to the Y direction and denotes a direction that is substantially orthogonal to a surface of a medium being transported. Furthermore, in each drawing, a +Y direction side denotes an apparatus front side, and a –Y direction side denotes an apparatus back side.

First Embodiment

With reference to FIG. 1, a scanner 10, which is an example image reading apparatus, will be described. The scanner 10 includes a lower unit 12, an upper unit 14, a medium mounting section 16, and a discharge tray 18. In this embodiment, although not illustrated in the drawings, the upper unit 14 is attached to the lower unit 12 so as to be rotatable about a downstream side in a medium transport direction as a rotation axis with respect to the lower unit 12.

A user interface section 20 is provided on the front side of the upper unit 14. The user interface section 20 is, for example, a touch panel, and serves as a display section and an operation section. The user interface section 20 is operated to cause the scanner 10 to perform a medium reading operation or other operations. A discharge port 22 is provided on the front side of the scanner 10 below the user interface section 20. The discharge tray 18 is provided below the discharge port 22. In this embodiment, the discharge tray 18 can be switched between a stored state in which the discharge tray 18 is stored within the lower unit 12 (FIG. 1 and FIG. 2) and a pulled state in which the discharge tray 18 is pulled from the lower unit 12 toward the front side.

Medium Transport Path

With reference to FIG. 2, a medium transport path 24 in the scanner 10 will be described. The bold solid line P in FIG. 2 indicates a guide path for a medium that is transported along the medium transport path 24 in the scanner 10.

The medium mounting section 16 is provided at an end portion of the lower unit 12 on the apparatus back side. The medium mounting section 16 can support media in an inclined orientation. On the medium mounting section 16, a plurality of sheets of media can be set. The medium mounting section 16 has a pair of edge guides 16a that can be moved to approach each other or separate from each other so as to guide the side portions of the media mounted on the medium mounting section 16.

On the medium transport path 24 in the lower unit 12, from an upstream side (–Y direction side) toward a downstream side (+Y direction side) in a medium transport direction, feeding rollers 26, separation rollers 28, a transport roller pair 30, which serves as "transport rollers", an image reading section 32, which serves as a "reading section", and a discharging roller pair 34 are provided. In this embodiment, for example, the feeding rollers 26 are driven and rotated by a drive source (not illustrated) that is provided in the lower unit 12.

The separation rollers 28 are disposed to face the feeding rollers 26. The separation rollers 28 are urged against the feeding rollers 26 by an urging section (not illustrated). The separation rollers 28 separate a plurality of sheets of media that have entered between the feeding rollers 26 and the separation rollers 28 so as to feed only the lowermost medium to be fed toward the downstream side in the transport direction. The medium that is supported in the inclined orientation on the medium mounting section 16 is nipped between the feeding rollers 26 and the separation rollers 28 and transported by the transport roller pair 30 that is disposed on the downstream side in the transport direction. The transport roller pair 30 transports the medium that has been transported from the feeding rollers 26 toward the image reading section 32.

The image reading section 32 includes a first reading unit 36A that is provided in the lower unit 12 so as to face a lower surface, that is, a first side, of the medium transported along the medium transport path 24, and a second reading unit 36B that is provided in the upper unit 14 so as to face an upper surface, that is, a second side, of the medium transported along the medium transport path 24. In this embodiment, the first reading unit 36A and the second reading unit 36B serve as a reading unit. For example, the reading unit is a contact image sensor (CIS) module.

The medium that has been transported to the image reading section 32 by the transport roller pair 30 is read in the image reading section 32 such that images on at least one of the first side and the second side of the medium are read. The medium is nipped by a discharging roller pair 34 that is disposed on the downstream side of the image reading section 32 in the transport direction, and discharged from the discharge port 22.

Medium Transport Path

With reference to FIG. 3 and FIG. 4, a structure relating to the transport of a medium in the medium transport path 24 will be described. As illustrated in FIG. 4, two feeding rollers 26 are disposed at an interval in the X-axis direction, which is the medium width direction, in the lower unit 12. More specifically, the feeding rollers 26 are located in a central portion in the X-axis direction in the medium transport path 24. In this embodiment, outer circumferential surfaces of the feeding rollers 26 are made of high-friction material, for example, elastomer such as rubber.

The separation rollers 28 are located to face the feeding rollers 26 in this embodiment, more specifically, in the upper unit 14 on the upper side in the apparatus height direction. In this embodiment, two separation rollers 28 are disposed at an interval in the X-axis direction so as to correspond to the feeding rollers 26. In this embodiment, outer circumferential surfaces of the separation rollers 28 are made of high-friction material, for example, elastomer such as rubber similarly to the feeding rollers 26.

In FIG. 3, a medium detection sensor 38 that serves as a "medium detection section" is provided within an area the separation roller 28 is disposed in the medium transport direction (Y-axis direction). The medium detection sensor 38 will be described below.

As illustrated in FIG. 4 and FIG. 5, a medium-feed detection sensor 40 that detects feeding of a medium P is provided on the downstream side of the feeding rollers 26 and the separation rollers 28 in the medium transport path 24. The medium-feed detection sensor 40 is, for example, an optical sensor.

As illustrated in FIG. 5, the medium-feed detection sensor 40 includes, for example, a light emitting section 40a that is provided on the lower unit 12 side and a light receiving section 40b that is provided on the upper unit 14 side. The light emitting section 40a and the light receiving section 40b are disposed to face each other across the medium transport path 24. While a medium P is being transported in the medium transport path 24, the medium P cuts off a beam of light emitted from the light emitting section 40a and thereby the medium P is detected. When the medium-feed detection sensor 40 detects the medium P, transmits a detection signal to a control section 42 (FIG. 2) that serves as a "controller".

The medium-feed detection sensor 40 according to the embodiment can detect whether a medium that has been fed is a carrier sheet (not illustrated), for example. Here, the carrier sheet refers to a sheet consists of two colorless transparent synthetic resin sheets joined together at part of their peripheral edge portions. The carrier sheet is transported on the medium transport path 24 with a booklet such as a passport or a folded medium sandwiched between the two sheets and is used for the image reading section 32 to read the medium sandwiched therebetween.

The medium-feed detection sensor 40, for example, reads a mark on the peripheral edge portion of the joined carrier sheet and detects the mark to determine that the medium that has been fed is a carrier sheet, and transmits a detection signal to the control section 42 (FIG. 2), which will be described below. When the medium-feed detection sensor 40 detects a carrier sheet, the control section 42 (FIG. 2) disables a detection signal from a multi-sheet feed detection sensor 44, which will be described below.

On the downstream side of the medium-feed detection sensor 40 in the transport direction in the medium transport path 24 in FIG. 4 and FIG. 5, the multi-sheet feed detection sensor 44 that detects multi-sheet feed of media P is disposed. The multi-sheet feed detection sensor 44 according to the embodiment is, for example, an ultrasonic sensor that includes a speaker section 44a that is provided in the lower unit 12 and a microphone section 44b that is provided in the upper unit 14.

The multi-sheet feed detection sensor 44 according to the embodiment oscillates ultrasonic waves from the speaker section 44a toward a medium P that passes through the medium transport path 24 and detects a reflected sound from the medium P by the microphone section 44b. The multi-sheet feed detection sensor 44 according to the embodiment can detect not only multi-sheet feed of media P but also detect the type of paper such as thick paper by using the frequency of a reflected sound. When the multi-sheet feed detection sensor 44 detects a medium P, transmits a detection signal to the control section 42 (FIG. 2), which will be described below.

As illustrated in FIG. 4, a medium-transport detection sensor 48 is provided on the downstream side of the transport roller pair 30 in the transport direction in the medium transport path 24. The medium-transport detection sensor 48 is, for example, a contact sensor that has a lever. A medium P that is transported along the medium transport path 24 presses the lever of the medium-transport detection sensor 48 at its leading edge, and thereby the lever is turned to the downstream side in the transport direction and displaced to a position in FIG. 4 shown by reference numeral 48-1. With this operation, the medium-transport detection sensor 48 detects the medium P. When the medium-transport detection sensor 48 detects the medium P, transmits a detection signal to the control section 42.

In this embodiment, the control section 42 (see FIG. 2) is provided in the lower unit 12. The control section 42 according to the embodiment is an electric circuit that includes a plurality of electronic components. The control section 42 receives detection signals from the medium detection sensor 38, the medium-feed detection sensor 40, the multi-sheet feed detection sensor 44, and the medium-transport detection sensor 48 and controls the reading operations in the first reading unit 36A and the second reading unit 36B and the rotating and driving operations in the feeding rollers 26, the transport roller pair 30, and the discharging roller pair 34.

The control section 42 also controls the operation for transporting a medium P and the image reading operation in the scanner 10, for example. The control section 42 may control operations necessary to perform the medium reading operation in the scanner 10 in accordance with an instruction from an external device such as a personal computer (PC).

Medium Detection Sensor

With reference to FIG. 3 and FIG. 5, the medium detection sensor 38 will be described. The medium detection sensor 38 according to the embodiment is, for example, an optical sensor. In FIG. 3, the medium detection sensor 38 is disposed so as to overlap the separation roller 28 in the side view of the medium transport path 24 viewed from the X-axis direction, specifically, at a location within a region occupied by the separation roller 28. A detection position S of the medium detection sensor 38 is set to a position overlapping the separation roller 28 in the Y-axis direction and the Z-axis direction, more specifically, a position within a region the separation roller 28 protrudes from the upper unit 14. In the drawings after FIG. 3, the detection position S schematically illustrates a detection position of the optical sensor.

It is preferable that the detection position S of the medium detection sensor 38 be a position closer to the downstream side (+Y direction side) than a nip position N1 in the Y-axis direction and closer to the feeding roller 26 side, that is, the lower side, than a rotation central position C1 (FIG. 5) of the separation roller 28.

In FIG. 4, each of the detection positions S of the medium detection sensors 38 is set to a position closer to the edge side of the medium than the nip position N1 of the feeding roller 26 and the separation roller 28 in the medium width direction (X-axis direction), that is, set so as to detect the medium at a position away from the nip position N1 in the outside direction (the +X-axis direction or the −X-axis direction) of the medium transport path 24. Specifically, the detection position S is set to a position within a detection position set region R1 outside the separation roller 28 in the X-axis direction.

The detection position set region R1 according to the embodiment is set within a region occupied by the separation roller 28 in the Y-axis direction and set within a region from a position outside the nip position N1 in the X-axis direction, specifically, from a position of the side portion of the separation roller 28 to the edge position of a medium of a maximum size that can be transported in the medium transport path 24.

In FIG. 5 and FIG. 6, when the medium P1 is normally transported toward the downstream side (+Y direction side) along the medium transport path 24 while being nipped by the feeding rollers 26 and the separation rollers 28, edge side portions P1S (in FIG. 6, the portions defined by chain double-dashed lines and in FIG. 5, a portion from the nip position N1 of the medium to a leading edge P1F) of the leading edge P1F of the medium P1 in the medium width direction are transported in the feeding direction (Y-axis direction) without being raised toward the separation roller 28 side, and thereby the medium P1 is not detected at the detection positions S of the medium detection sensors 38. As a result, the control section 42 receives no detection signal from the medium detection sensor 38, and the transport of the medium P1 toward the downstream side in the transport direction is continued.

In FIG. 7 and FIG. 8, when a medium P2 is transported along the medium transport path 24 to the nip positions N1 of the feeding rollers 26 and the separation rollers 28, in some cases, a central portion P2C (FIG. 7) of a leading edge P2F of the medium P2 fails to enter between the feeding rollers 26 and the separation rollers 28. In such a case, since the feeding rollers 26 keep rotating, the transport of the medium P2 is continued.

As a result, edge side portions P2S of the leading edge P2F of the medium P2 in the medium width direction are deformed inward toward the central portion P2C as illustrated in FIG. 7. With this deformation, the edge side portions P2S are raised toward the separation roller 28 side and enter the region occupied by the separation rollers 28 in the side view of the medium transport path 24 viewed from the X-axis direction as illustrated in FIG. 8. In such a state, the medium detection sensor 38 detects the raised edge side portions P2S of the medium P2 at the detection position S. It should be noted that the heavy line in FIG. 8 schematically illustrates only the edge portion of the medium P2 on the −X direction side in the side view of the medium transport path 24 viewed from the X-axis direction.

The medium detection sensors 38 transmit a detection signal indicating the detection of the edge side portions P2S to the control section 42. When the control section 42 receives the detection signal from the medium detection sensors 38, the control section 42 stops the rotation of the feeding rollers 26. With this operation, the transport of the medium P2 can be stopped before the medium P2 causes a jam (paper jam) that will seriously damage the medium P2 in the medium transport path 24, for example, breakage of the medium P2, and thereby the damage to the medium P2 can be reduced or prevented.

In FIG. 9 and FIG. 10, operations to be performed when a plurality of sheets of media that have been stapled will be described. In FIG. 9, a medium P3 and a medium P4 have been stapled at a side end portion in the −X direction on a medium leading edge side in the transport direction. In this state, when the medium P3 and the medium P4 are transported toward the downstream side in the transport direction, the medium P3 that is located on the lower side in the apparatus height direction is nipped by the feeding rollers 26 and the separation rollers 28 and transported toward the downstream side from the nip positions N1. On the other hand, the medium P4 that is located on the upper side in the apparatus height direction is transported toward the upstream side in the transport direction by the separation rollers 28.

As a result, the medium P3 is transported in the counterclockwise direction in FIG. 9 about a portion P3S that has been stapled while being transported toward the downstream side in the transport direction as illustrated in FIG. 9. In such a state, the stapled portion P3S moves to the side (−X direction side) of the separation roller 28 while being raised as illustrated in FIG. 10, and thereby the raised stapled portion P3S is detected by the medium detection sensors 38. It should be noted that the heavy line in FIG. 10 schematically illustrates only the edge portion of the medium P3 on the −X direction side in the side view of the medium transport path 24 in the X-axis direction, and the medium P4 is omitted.

The medium detection sensors 38 transmit a detection signal indicating the detection of the stapled portion P3S to the control section 42. When the control section 42 receives the detection signal from the medium detection sensors 38, the control section 42 stops the rotation of the feeding rollers 26. With this operation, the transport of the stapled medium P3 and the medium P4 can be stopped before the medium P3 and the medium P4 are seriously damaged by continuing the transport of the stapled medium P3 and the medium P4, for example, before the stapled medium portion P3S is torn off in the medium P3 and the medium P4. Accordingly, the damage to the medium P3 and the medium P4 can be reduced or prevented.

Modifications of First Embodiment (1) In FIG. 11, rib-shaped restriction sections 50 are provided in the upper unit 14 in which the medium detection sensors 38 are provided. The regulation sections 50 protrude from the upper unit 14 toward the medium transport path 24. More specifically, the regulation sections 50 according to the modification are formed to have substantially the same shape and dimensions as the part of the separation roller 28 protruding from the upper unit 14 toward the medium transport path 24. It should be noted that substantially the same shape and dimensions are not exactly the same shape and dimensions and may include manufacturing errors and other errors.

The regulation sections 50 are disposed so as to overlap the separation rollers 28 in the medium transport path (Y-axis direction) in the side view of the medium transport path 24 in the X-axis direction. As illustrated in FIG. 11, when the regulation sections 50 are viewed from the downstream side to the upstream side in the medium transport direction, the regulation sections 50 are disposed outside the detection positions S of the medium detection sensors 38 at positions closer to the medium edge sides in the medium width direction (X-axis direction) that intersects the medium transport direction. It should be noted that the regulation sections 50 (FIG. 11) according to the modification are ribs, however, the regulation sections 50 may be roller members.

According to the modification, when a medium P5 that warps at the edge portions in the medium width direction is transported, the warps in the edge portions P5S of the medium P5 can be reduced or prevented. Accordingly, the warps in the medium P5 can be reduced as illustrated in FIG. 11 (the heavy line denoted by reference numeral P5 in FIG. 11), and the edge portions P5S of the medium P5 can be regulated or prevented from entering the detection positions S of the medium detection sensors 38. In FIG. 11, the chain double-dashed line denoted by reference numeral P5-1 illustrates the edge portions that are being transported while warping and the edge portions are detected by the medium detection sensors 38.

As a result, when the edges of a medium are warped, for example, when a medium is deformed but not so serious to cause a jam, the edges of the medium can be prevented from entering the detection areas of the medium detection sensors 38. Consequently, it can be prevented or reduced that the warped edges are detected by the medium detection sensors 38 and erroneously determined by the control section 42 to stop the feeding of the medium. Accordingly, the medium that can be continued to be fed properly without problems can be continued to be fed and thereby the convenience of the scanner 10 can be increased.

In this modification, the regulation sections 50 are disposed on the upper unit 14 side where the medium detection sensors 38 are provided, and alternatively, for example, when the medium detection sensors 38 are provided on the lower unit 12 side as illustrated in FIG. 12, the regulation sections 50 may be disposed on the lower unit 12 side.

(2) In this embodiment, in the side view of the medium transport path 24 viewed from the X-axis direction, the medium detection sensors 38 are disposed within a region the medium detection sensors 38 overlap the separation rollers 28. Alternatively, as illustrated in FIG. 13, in the side view of the medium transport path 24 viewed from the X-axis direction, the medium detection sensor 38, more specifically, the detection position S of the medium detection sensor 38 may be disposed within the region where the detection position S overlaps the feeding roller 26, or as illustrated in FIG. 14, in the side view of the medium transport path 24 viewed from the X-axis direction, the medium detection sensors 38 (the detection positions S of the medium detection sensors 38) may be disposed within a region where the detection position S overlaps the separation roller 28 and within a region where the detection position S overlaps the feeding roller 26 respectively.

(3) In this embodiment, in the scanner 10, feeding of a medium P is performed in a state where the medium detection sensors 38 can perform detection, and alternatively, the medium detection sensors 38 may be turned off by operating the user interface section 20 so as not to perform the detection, and a medium P may be fed in the non-detection state. When the scanner 10 is connected to an external device (for example, a PC), the detection state of the medium detection sensor 38 may be turned off by an external input.

(4) In this embodiment, the medium detection sensors 38 are provided, and alternatively, for example, the medium-feed detection sensor 40 (FIG. 4) may be disposed at both sides of the feeding rollers 26 and the separation rollers 28 that are disposed in a central section in the medium transport path 24 in the medium width direction to detect raised edge portions of a medium P.

(5) In this embodiment, two feeding rollers 26 and two separation rollers 28 are provided with intervals in the medium width direction, and alternatively, one or three or more feeding rollers 26 and separation rollers 28 may be provided.

Second Embodiment

With reference to FIG. 15 and FIG. 16, the second embodiment will be described. This embodiment differs from the first embodiment in that a passage detection sensor 52 is disposed between the feeding rollers 26 and the transport roller pair 30 in the medium transport direction.

As illustrated in FIG. 15, the passage detection sensor 52 is disposed between the feeding rollers 26 and the transport roller pair 30 in the medium transport direction. In this embodiment, as an example, the passage detection sensor 52 is disposed at a position closer to the feeding rollers 26 than the transport roller pair 30 on the downstream side of the feeding rollers 26 in the transport direction. In FIG. 15, the passage detection sensor 52 is displaced to a position indicated by the chain double-dashed line denoted by reference numeral 52-1 and thereby detects the passage of the medium P. It should be noted that the configuration of the passage detection sensor 52 according to the embodiment is similar to that of the medium-transport detection sensor 48.

Here, if deformation that will not cause a jam such as wrinkles or folds appear in a medium being transported, even if the medium is detected by the medium detection sensors 38, in some cases, the feeding of the medium can be continued. In this embodiment, to deal with such a case, the control section 42 controls the rotation of the feeding rollers 26 in accordance with detection signals from the medium detection sensors 38 and the passage detection sensor 52. Hereinafter, the control operations will be described.

In FIG. 16, in step S1, the control section 42 starts to drive and rotate the feeding rollers 26 to start to feed a medium. In step S2, after the medium has been transported by the feeding rollers 26 by a predetermined amount toward the downstream side in the medium transport direction, the control section 42 determines whether the medium detection sensors 38 have detected the medium. If the control section 42 receives a medium detection signal from the medium detection sensors 38, in step S3, rotates the feeding rollers 26 by an amount of rotation of the feeding rollers 26 corresponding to a distance (path length) from the detection position S of the medium detection sensor 38 to the passage detection sensor 52.

In step S4, the control section 42 determines whether the passage detection sensor 52 has detected the medium. If the control section 42 receives a medium detection signal from the passage detection sensor 52, continues to transport the medium toward the downstream side in the medium feeding direction. In step S5, the control section 42 determines whether the medium-transport detection sensor 48 has detected the medium. If the control section 42 receives a medium detection signal from the medium-transport detection sensor 48, in step S6, the control section 42 continues to feed the medium and performs a reading operation on at least one of the first side and the second side of the medium in the image reading section 32. After the medium reading operation in the image reading section 32 has completed, in step S7, the control section 42 nips the read medium by the discharging roller pair 34 to discharge the medium from the discharge port 22, and thereby the medium transport operations end.

If the medium detection sensors 38 have not detected the medium in step S2, the control section 42 determines that the edge portions of the medium are normal (not raised), and in step S8, the control section 42 continues to transport the medium.

In step S9, the control section 42 determines whether the medium-transport detection sensor 48 has detected the medium. If the control section 42 receives a medium detection signal from the medium-transport detection sensor 48, in step S10, the control section 42 continues to feed the medium and performs a reading operation on at least one of the first side and the second side of the medium in the image reading section 32. After the medium reading operation in the image reading section 32 has completed, in step S11, the control section 42 nips the read medium by the discharging roller pair 34 to discharge the medium from the discharge port 22, and thereby the medium transport operations end.

If the passage detection sensor 52 has not detected the medium in step S4, if the medium-transport detection sensor 48 has not detected the medium in step S5, or if the medium-transport detection sensor 48 has not detected the medium in step S9, the control section 42 determines that a medium jam has occurred in step S12 and stops the rotation of the feeding rollers 26, the transport roller pair 30, and the discharging roller pair 34 to stop the transport of the medium, and thereby the medium transport operations end.

According to the embodiment, if deformation that will probably not cause a jam appears in a medium, the medium can be appropriately fed and if deformation that will probably cause a jam appears in a medium, the feeding of the medium is stopped to reduce damages to the medium. Consequently, the medium can be appropriately fed and the convenience of the scanner 10 can be increased.

Modifications of First Embodiment and Second Embodiment (1) In the first embodiment and the second embodiment, the medium detection sensors 38 are disposed on both sides (the +X-axis direction side and the −X-axis direction side) of the feeding rollers 26 and the separation rollers 28 in the X-axis direction in the medium transport path 24. Alternatively, the medium detection sensor 38 may be disposed only one of the +X-axis direction side or the −X-axis direction side of the feeding rollers 26 and the separation rollers 28.

(2) In the first embodiment and the second embodiment, the medium detection sensors 38 are the optical sensors as an example. Alternatively, the medium detection sensors 38 may be mechanical sensors, touch sensors, ultrasonic sensors, or other sensors.

In summary, the scanner 10 includes the medium mounting section 16 on which media P are to be mounted, the feeding rollers 26 that come into contact with the lowermost medium of media P mounted on the medium mounting section 16 and transport the medium P toward the downstream side, the feeding rollers 26 that are provided in the central region in the X-axis direction, which is the medium width direction that intersects the Y-axis direction which is the medium transport direction, the separation rollers 28 that nip and separate the medium P with the feeding rollers 26 therebetween, the image reading section 32 that is provided on the downstream side of the feeding rollers 26 to read the medium, and the medium detection sensor 38 that can detect the medium at the detection position S closer to the edge side of the medium P than the nip positions N1 of the feeding rollers 26 and the separation rollers 28 in the X-axis direction, which is the medium width direction, and overlaps one of the feeding rollers 26 and the separation rollers 28 in the side view of the medium transport path 24.

With this structure, the scanner 10 includes the medium detection sensor 38 that can detect the medium P at the detection position S closer to the edge side of the medium P than the nip positions N1 of the feeding rollers 26 and the separation rollers 28 in the X-axis direction, which is the medium width direction, and overlaps one of the feeding rollers 26 and the separation rollers 28 in the side view of the medium transport path 24. Consequently, the medium P that has entered the detection position S due to a deformation can be detected, that is, by detecting a deformation in the medium P before the medium P causes a jam, damages to the medium can be reduced or prevented.

The detection positions S may be provided at a position overlapping the separation roller 28 in the side view of the medium transport path 24 and a position overlapping the feeding roller 26 in the side view of the medium transport path 24. With this structure, if a medium P is deformed to either the separation roller 28 side or the feeding roller 26 side, the deformation can be detected.

The detection position S may be provided at a position overlapping the separation roller 28 in the side view of the medium transport path 24. In the structure in which the lowermost medium P of the media P mounted on the medium mounting section 16 is fed, particularly, when a feed job is performed on media that are stapled on the upstream side, the medium (the lowermost medium) being fed tends to be deformed to the separation roller 28 side. To solve the problem, in this structure, the detection position is provided to the position overlapping the separation roller 28 in the side view of the medium transport path 24. Consequently, a deformation in the medium P can be detected further efficiently before the medium P causes a jam.

The detection position S may be on the downstream side of the nip positions N1 of the feeding rollers 26 and the separation rollers 28 in the Y-axis direction, which is the medium transport direction, and on the side closer to the feeding roller 26 side than the rotation central position C1 of the separation roller 28 in the Z-axis direction, which intersects the surface of the medium P. With this structure, the detection position S is provided in the region where a deformed medium tends to enter more easily, that is, at the position on the downstream side (the +Y direction side) of the nip positions N1 of the feeding rollers 26 and the separation rollers 28 in the Y-axis direction, which is the medium transport direction, and on the side closer to the feeding roller 26 side than the rotation central position C1 of the separation roller 28 in the Z-axis direction, which intersects the surface of the medium P. Accordingly, a deformation in the medium P can be detected further efficiently before the medium P causes a jam.

The scanner 10 may include the regulation section 50 that regulates an entry of the medium into a region on the separation roller 28 side in the side view of the medium transport path 24 at a position closer to the edge of the medium P than the detection position S in the X-axis direction, which is the medium width direction.

For example, a medium P that is warped to some extent at its edges can enter the detection position S although the deformations are not so serious to cause a jam and in such a case, the scanner 10 may erroneously determine to stop the feeding. To solve the problem, the above-described structure may include the regulation section 50 that regulates an entry of a medium into a region on the separation roller 28 side in the side view of the medium transport path 24 at a position closer to the edge of a medium P than the detection position S in the X-axis direction, which is the medium width direction. Consequently, entering of a medium P, which can be continued to be fed properly without problems, into the detection position S can be prevented and thereby the above-described erroneous determination can be prevented.

The scanner 10 may include the control section 42 that controls the feeding rollers 26. When the control section 42 detects a medium P at the detection position S by the medium detection sensor 38, stops the feeding rollers 26. With this structure, the feeding operation is stopped before the medium P causes a jam, and thereby damages to the medium P can be prevented or damages to the medium P can be reduced.

The scanner 10 may include the transport roller pair 30, which is provided on the upstream side of the image reading section 32 in the Y-axis direction, which is the medium transport direction, to transport a medium P toward the image reading section 32 side, the passage detection sensor 52, which is provided between the transport roller pair 30 and the feeding rollers 26, to detect a passage of the medium P, and the control section 42 that controls the feeding rollers 26. When the medium detection sensor 38 detects the medium P at the detection position S, the control section 42 drives the feeding rollers 26 by an amount corresponding to the distance from the detection position S to the passage detection sensor 52. As a result of the drive of the feeding rollers 26, if the passage detection sensor 52 has detected a passage of a leading edge of the medium P, the control section 42 continues to feed the medium P by the feeding rollers 26, and as a result of the drive of the feeding rollers, if the passage detection sensor 52 has not detected a passage of a leading edge of the medium P, the control section 42 stops the feeding rollers 26.

With this structure, when the medium detection sensor 38 detects the medium P at the detection position S, the control section 42 drives the feeding rollers 26 by an amount corresponding to the distance from the detection position S to the passage detection sensor 52 and as a result of the drive of the feeding rollers 26, if the passage detection sensor 52 has detected a passage of a leading edge of the medium P, the control section 42 continues to feed the medium P by the feeding rollers 26. In other words, if the passage detection sensor 52, which is disposed on the downstream side of the medium detection sensor 38, detects a passage of the leading edge of the medium P that has been detected by the medium detection sensor 38, the medium P can be properly fed, and in such a case, the feeding can be continued. With this operation, the scanner 10 can be prevented from unnecessarily stopping the feeding.

As a result of the drive of the feeding rollers 26, if the passage detection sensor 52 has not detected a passage of the leading edge of the medium P, the control section 42 determines that a jam has occurred and stops the feeding rollers 26. Consequently, damages to the medium P can be prevented or damages to the medium P can be reduced.

The detection position S may be provided at a position overlapping the separation roller 28 in the side view of the medium transport path 24. With this structure, a medium P that has been deformed to the feeding roller 26 side can be detected, and consequently, the deformed medium P can be detected before it causes a jam and damages to the medium P can be prevented.

It is to be understood that the present invention is not limited to the above-described embodiments, various modifications can be made within the scope of the following claims, and these modifications are included within the scope of the invention.

The entire disclosure of Japanese Patent Application No. 2017-123994, filed Jun. 26, 2017 is expressly incorporated by reference herein.

What is claimed is:

1. An image reading apparatus comprising:
a medium mounting section on which media are to be mounted;
feeding rollers configured to come into contact with the lowermost medium of media mounted on the medium mounting section and transport the medium toward a downstream side, the feeding rollers being provided in a central region in a medium width direction that intersects a medium transport direction;
separation rollers configured to nip and separate the medium with the feeding rollers therebetween;
a reading section provided on the downstream side of the feeding rollers, the reading section being configured to read the medium;
a medium detection section configured to detect the medium at a detection position closer to an edge side of the medium than the nip positions of the feeding rollers and the separation rollers in the medium width direction and the detection position overlapping one of the feeding rollers and the separation rollers in a side view of the medium transport path; and
a controller configured to control the feeding rollers,
wherein if the medium detection section detects the medium at the detection position, the controller stops the feeding rollers.

2. The image reading apparatus according to claim 1, wherein the detection positions are provided at a position overlapping the separation roller in the side view of the medium transport path and a position overlapping the feeding roller in the side view of the medium transport path.

3. The image reading apparatus according to claim 1, wherein the detection position is provided at a position overlapping the separation roller in the side view of the medium transport path.

4. The image reading apparatus according to claim 3, wherein the detection position is on the downstream side of the nip positions of the feeding rollers and the separation rollers in the medium transport direction and on a side closer to the feeding roller side than a rotation central position of the separation roller in a direction intersecting a surface of the medium.

5. The image reading apparatus according to claim 3, further comprising:
a regulation section configured to regulate an entry of the medium into a region on the separation roller side in the side view of the medium transport path at a position closer to the edge of the medium than the detection position in the medium width direction.

6. The image reading apparatus according to claim 1, further comprising:
transport rollers provided on an upstream side of the reading section, the transport rollers being configured to transport the medium toward the reading section side; and
a passage detection section provided between the transport rollers and the feeding rollers, the passage detection section being configured to detect a passage of the medium,
wherein if the medium detection section has detected the medium at the detection position, the controller drives the feeding rollers by an amount corresponding to a distance from the detection position to the passage detection section, if the passage detection section has detected a passage of a leading edge of the medium as a result of the drive of the feeding rollers, continues to feed the medium by the feeding rollers, and if the passage detection section has not detected a passage of a leading edge of the medium as a result of the drive of the feeding rollers, stops the feeding rollers.

7. The image reading apparatus according to claim 1, wherein the detection position is provided at a position overlapping the feeding roller in the side view of the medium transport path.

\* \* \* \* \*